United States Patent Office 3,468,629
Patented Sept. 23, 1969

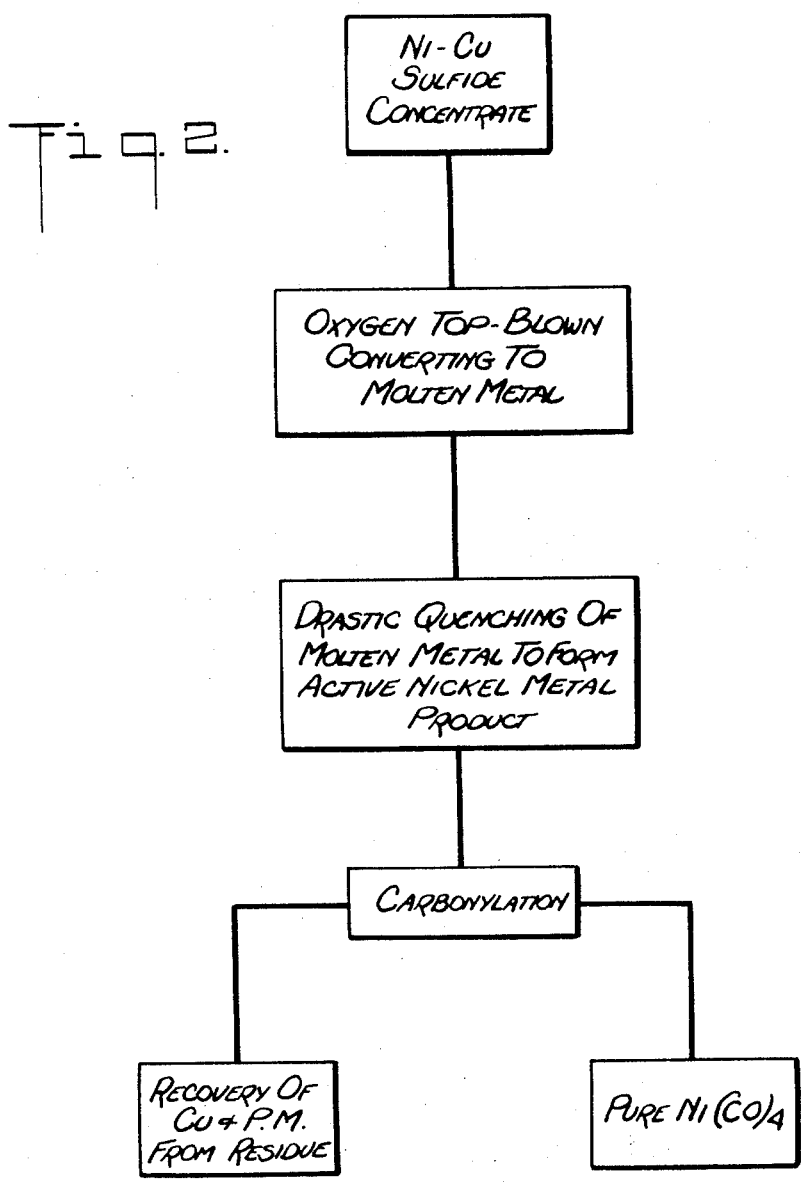

3,468,629
RECOVERY OF NICKEL FROM NICKEL-CONTAINING SULFIDE MATERIALS
Walter Curlook, Copper Cliff, Ontario, Canada, Charles E. O'Neill, Upper Montclair, N.J., and Paul E. Queneau, Fairfield, Conn., assignors to The International Nickel Company, Inc., New York, N.Y., a corporation of Delaware
Filed Feb. 28, 1966, Ser. No. 530,573
Claims priority, application Canada, Mar. 12, 1965, 925,495
Int. Cl. C01b 31/26
U.S. Cl. 23—203    8 Claims

ABSTRACT OF THE DISCLOSURE

A process is disclosed for producing nickel carbonyl. The process comprises establishing a molten bath containing up to about 45% copper, less than about 3% iron, less than about 4% sulfur and the balance essentially nickel and drastically quenching the molten bath of such composition to provide particles with sulfur uniformly distributed therethroughout, which drastically quenched particles are characterized by high nickel extractions during low superatmospheric pressure carbonylation.

---

Figure 1:
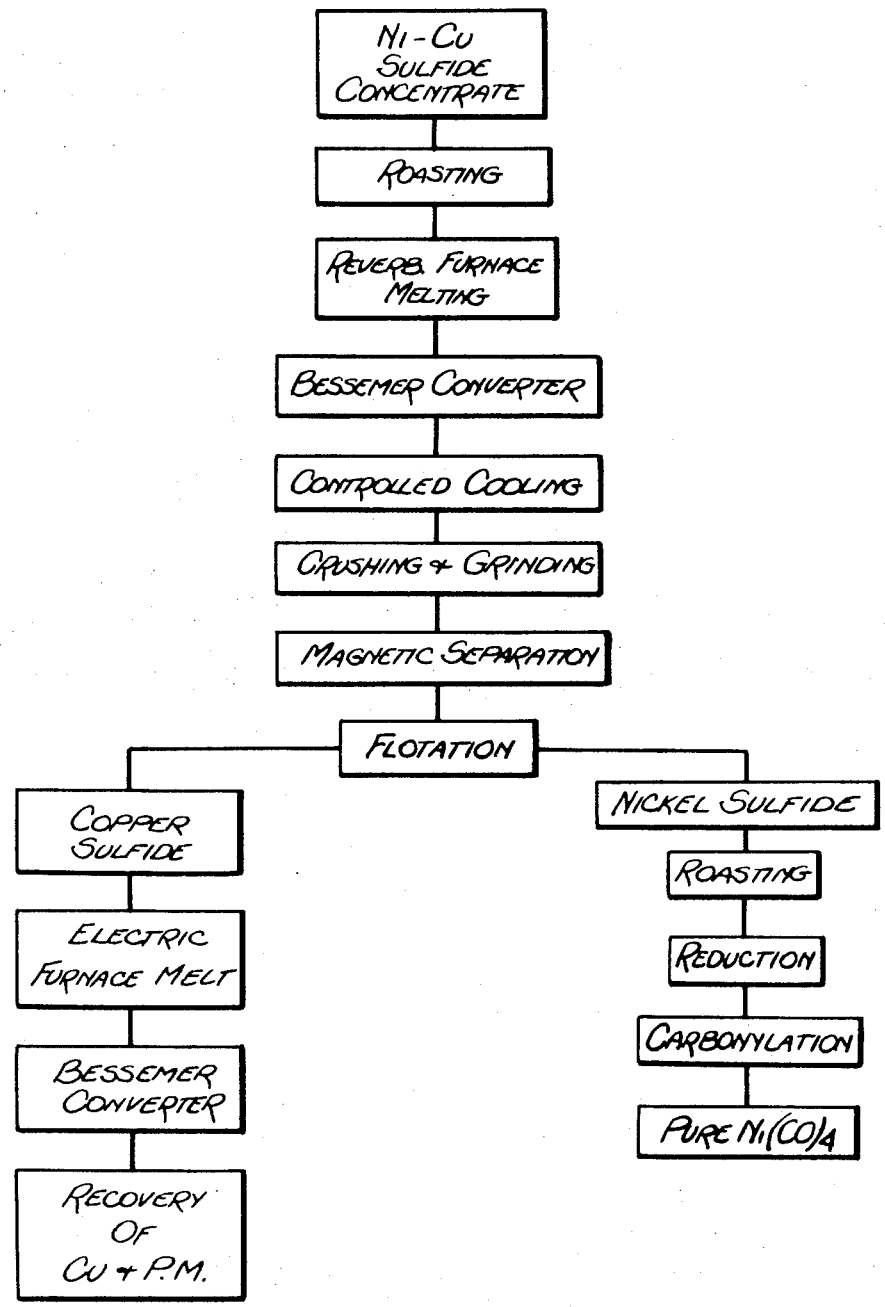

The present invention relates to an improved process for treating nickel-containing sulfidic materials and, more particularly, to a simplified process for treating such materials to produce nickel carbonyl therefrom.

Commercial methods are known for treating nickel-containing materials with the object of recovering nickel carbonyl in the pure state. However, such methods generally involve numerous material handling steps requiring the use of many different types of equipment, including reverberatory or blast furnaces, roasters, reduction and melting furnaces, crushing and grinding equipment, magnetic separators, flotation equipment, and the like. Because commercial nickel sulfide materials frequently contain additional metal values, such as iron, cobalt, copper, and precious metals, among others, the extractive metallurgy of such materials is usually complex and the schemes which have been proposed and/or adopted for working up these materials have generally reflected the complexity of the metallurgy involved.

A need has existed for many years for a more direct economical approach to the extractive metallurgy of nickel-containing sulfide materials and, in particular, for a method which would simplify the materials handling problem and which would require only a few operational steps to convert the raw material to the desired end product.

We have now discovered such a method which commercially utilizes a minimum number of operational steps in the treatment of sulfide materials rich in nickel such as ores, concentrates, mattes, including furnace mates produced from nickel oxide ores, for example, lateritic nickel-containing ores, sulfided metal mixtures containing nickel and the like. We find that by using a special combination of operational steps, we may employ plant equipment requiring a minimum amount of capital expenditure and still produce a desirable nickel product, such as substantially pure nickel carbonyl.

It is an object of the present invention to provide an improved method for extracting an active form of nickel from nickel-containing sulfide materials involving the use of only a few direct method steps and a minimum amount of materials handling.

Another object of the invention is to provide an improved method utilizing a combination of simple treating steps for producing substantially pure nickel carbonyl from a nickel-containing sulfide material with minimum capital outlay for plant and equipment.

Other objects and advantages will become apparent from the following description taken in conjunction with the accompanying drawing in which:

FIGURE 1 depicts a flow diagram of a current commercial method for producing nickel carbonyl and other metal values from a nickel-containing sulfide material; and FIGURE 2 depicts a flow diagram for the simplified process contemplated in accordance with the present invention having as one of its objects the production of nickel carbonyl.

Stating it broadly, we have found that by establishing a molten metal bath containing by weight up to about 40% copper, up to about 2% or even 3% iron, from about 0.2% to 2% sulfur, with the balance essentially nickel, and by subjecting metal from the molten nickel-containing bath to virtually instantaneous solidification, that is to drastic cooling or quenching to room or ordinary temperatures, for example, by directing and impinging a high velocity stream of water against a stream of the molten bath, we can provide solid activated nickel-containing particles in the virtually instantaneously solidified condition characterized by an intimate and uniform distribution of controlled amounts of sulfur throughout the resulting product, corresponding substantially to the sulfur distribution existing in the bath just prior to quenching. We find that this characteristic of the nickel product is particularly advantageous for our purposes as it insures an active nickel metal product which is capable of being easily and efficiently carbonylated at normal carbonylating temperatures and at relatively low superatmospheric pressures.

While one method of drastic quenching has been described in the production of activated nickel particles, it will be appreciated that other methods may be employed as may occur to those skilled in the art. For example, drastic quenching from the molten state may also be achieved by contacting a stream of the sulfur-containing molten nickel metal with a water-cooled metal surface of high heat conductivity, such as a water-cooled copper surface designed for rapid heat transfer. As stated hereinbefore, the purpose of the drastic quenching treatment is to preserve as closely as possible the intimate and uniform distribution or dispersion of sulfur as it exists in the molten bath prior to quenching. We find that this treatment is important in that it inhibits sulfur segregation in the solid metal, the increased presence of which is usually indicative of unsatisfactory activity.

In practicing our invention, we have found that we can establish the aforementioned bath composition by starting with a nickel-bearing sulfide material, such as a sulfide ore, a sulfide concentrate, a matte, e.g., a furnace matte produced from nickel oxide ores (for example, sulfided lateritic nickel-containing ores as disclosed in U.S. Patent No. 3,004,846), or sulfided metal mixtures. We find that our invention is commercially and economically advantageous in the treatment of the foregoing types of raw materials.

Illustrative nickel-containing sulfide materials contemplated for treatment within the broad scope of our invention are those containing by weight up to about two-thirds iron, up to about one-third copper, up to about 5% cobalt, at least about 5% and up to about 35% sulfur, and the balance substantially nickel ranging from at least about 15% and up to about 75% of the material.

A processing step we find particularly advantageous commercially for our purposes in establishing the desired bath composition from the foregoing nickel sulfide material comprises autogenously converting the material by utilizing oxygen surface blowing converter means in which strong, induced agitation of the bath is employed to melt the raw material, to remove substantially all of the iron to below about 2%, usually to below about 0.5%, e.g., about 0.2%, by weight, and, in addition, remove most of the sulfur, practically all of the iron being removed first, so as to leave remaining in the melt controlled amounts of iron and sulfur, e.g., from about 0.2% to 2% each by weight of the final material. After the aforementioned composition of the bath has been established, the molten metal is then drastically cooled or quenched to form the desired nickel product in the virtually instantaneously solidified condition containing only a limited amount of iron and the special amount of sulfur required to insure a highly active nickel product. The thus produced nickel product in particulate form may thereafter be subjected to carbonylation at an elevated temperature and a low superatmospheric pressure with carbon monoxide to recover substantially all of the nickel, for example, 90% or higher of the total nickel content, as substantially pure nickel carbonyl.

In carrying our invention into practice using a minimum of operational steps, a molten bath of nickel concentrate, e.g., penteandite concentrate, is established in the furnace which advantageously is mechanically rotated. The bath is brought up to a temperature of the order of 2000° F. and oxygen blown in or upon the surface of the bath to lower the iron content to an acceptable level. Siliceous flux may be added for this purpose and the resulting slag, which also contains molten gangue constituents from the concentrate, is removed. On the other hand, when the amount of iron in solution is lowered to acceptable levels, iron present in the bath as an oxide does not have to be completely removed from the bath since iron in this form does not interfere with carbonylation at relatively low superatmospheric pressures. Additional nickel concentrate may be added as required to maintain the bath level and prevent it from overheating. During the oxygen surface blowing operation, temperature control must be exercised to prevent undue damage to the refractories. Usually, it is unnecessary to operate at bath temperatures exceeding about 3300° F. One means of utilizing the large quantities of heat available is to replace a part of the oxygen blast to the molten charge with steam. The steam partially reacts with the molten sulfides to form hydrogen sulfide. If it is desired, the product gases containing both sulfur dioxide and hydrogen sulfide may be recovered for use in making chemical products, or may be further treated to recover elemental sulfur. Another means of controlling temperature is to supply part of the oxygen in the form of cold nickel oxide which is simultaneously reduced to nickel metal.

After lowering the iron content of the bath to an acceptable level, the bath temperature usually will be in excess of 2000° F., e.g., 2400° F. At about this stage of the process, the desulfurization of nickel sulfide or sulfur removal is commenced. At and above these temperatures, oxygen reacts with nickel sulfide to produce metallic nickel and sulfur dioxide. As desulfurization proceeds, the temperature of the bath is controlled to insure that the bath remains molten and has sufficient fluidity to effectuate the oxygen-nickel sulfide reaction. Where the final product of the reaction is substantially metallic nickel, oxygen will tend to react with some of the nickel to form high melting nickel oxide. Consequently, vigorous agitation is necessary throughout the converter operation to disperse nickel oxide and to react it with sulfur remaining in the bath and to prevent formation of a high melting point dross of nickel oxide which will hinder or, in extreme cases, completely stop the oxygen reactions at the bath surface. As the sulfur is further removed to lower its concentration to the range of about 5 to about 2 weight percent, the temperature of the bath is controlled between the melting point of the bath and 3300° F. When the sulfur has been removed to or below about 5 percent, the oxygen treatment can be discontinued, whereupon oxygen dispersed in the agitated bath reacts with residual sulfur therein which is removed as sulfur dioxide to further reduce the sulfur content of the bath to the desired level of about 0.2% or 0.25% to 2% by weight. The oxygen blow may be discontinued at lower sulfur levels and the oxygen replaced with a reducing atmosphere to minimize the final oxygen content of the melt. The oxygen blowing may be discontinued anywhere between the finally desired sulfur level and about 5 percent sulfur so long as the oxygen level in the bath and the atmosphere is controlled to insure the desired final sulfur content while minimizing the oxygen content of the final product. The temperature of the bath in the final sulfur or oxygen removal stages is maintained by introducing heated air or the products of combustion of fuel. Thus, in this final stage of the blow, the atmosphere impinging upon the bath surface is controlled to range from slightly oxidizing to reducing depending upon the bath sulfur content at which the oxygen treatment is discontinued. When the oxygen in the bath has been substantially eliminated and the desired composition has been achieved, the molten metal containing dissolved sulfur in active amounts is then drastically quenched by directing a high velocity continuously flowing stream of water against a stream of the bath or, as stated hereinbefore, portions of the bath may be virtually instantaneously solidified by other means, such as by contacting a stream of the molten bath with a moving water-cooled copper surface designed for rapid heat transfer.

When a drastically quenched particulate nickel metal product containing controlled amounts of iron and sulfur has been produced in accordance with the invention, it is so active in the carbonylation reaction at relatively low superatmospheric pressures that the feed to the carbonyl reactor can be quite coarse, e.g., about $\frac{1}{16}$ inch. Suitable operating conditions for carbonylation of the highly active material include temperatures of between about 150° F. and about 350° F. and low superatmospheric pressures, e.g., below about 100 atmospheres advantageously between about 10 atmospheres gauge and about 60 atmospheres gauge. It will be appreciated that the residue from the carbonyl treatment will vary in composition depending upon the metallic content of the sulfide nickel material initially charged to the oxygen blowing converter. Copper, cobalt and precious metals present in the active metal are concentrated in the residue. The residue may conveniently be worked up by leaching the copper and cobalt, e.g., with an ammoniacal leach solution to obtain a metal-bearing liquor which may then be worked up by conventional means.

As has been stated hereinbefore, substantially all of the iron present in the nickel-containing sulfidic material is eliminated during the converting operation. In addition to the iron, the amount of cobalt, if present, is generally substantially decreased; for example, to a nickel to cobalt ratio of over 200:1. Also, highly active metal containing sulfur in the amounts and in the state of distribution prescribed by the present invention yields upon carbonylation nickel carbonyl containing only traces of iron and cobalt carbonyls. Another advantageous feature of the highly active nickel metal produced in accordance with the present invention is that, even when copper is present in amounts of up to about 40% of the total weight of the product, carbonylation proceeds readily at surprisingly low superatmospheric carbonylation pressures.

In order to illustrate the simplicity of the process starting with autogenous smelting as applied to the manufacture of nickel carbonyl, reference is now made to the accompanying drawing wherein FIGURE 1 depicts a process currently used for working up nickel-copper-sulfide concentrates. It will be seen from the attached FIGURE 1 that the currently employed operation involves roasting, reverberatory furnace melting, Bessemer converting, controlled cooling of the Bessemer product, crushing and grinding, magnetic separation, flotation, roasting of the separated nickel sulfide, reduction and carbonylation of the reduced nickel oxide to yield pure nickel carbonyl. The copper sulfide from the controlled cooling operation is worked up separately for the recovery of copper. On the other hand, FIGURE 2 depicts a process contemplated in carrying out one embodiment of the present invention in which only an oxygen blown converter is employed to convert autogenously the initial sulfide material to the desired product without using fuel, followed by drastic quenching of portions of the final bath composition to produce an active nickel metal product in the particulate form, and then followed by carbonylation of the particulate product at elevated pressures, e.g., below about 100 atmospheres, to form pure nickel carbonyl substantially free from iron and cobalt. The residue from the carbonylation reaction may then be worked up to recover copper, cobalt and precious metals. As illustrative of the present invention, the following examples are given:

Example I

In order to illustrate the importance of controlling the residual sulfur content in the bath established from nickel sulfide materials, batches of metal of different sulfur contents were prepared from nickel sulfide material. The nickel sulfide material treated contained about 70% nickel and about 25% sulfur as well as small amounts of copper, cobalt and iron. The removal of sulfur by surface blowing with oxygen was employed for each molten bath except that blowing was discontinued at varying residual sulfur levels. Agitation during the process was supplied by electromagnetic induction. Five batches of metal were prepared with residual sulfur contents of 0.04%, 0.10%, 0.56%, 0.90% and 1.16%, respectively.

Five carbonylating tests were conducted on metal from each of the five batches in which the final nickel metal product in the molten state was drastically quenched in water to provide a particulate nickel metal product in a virtually instantaneously solidified condition having an intimate and uniform distribution or dispersion of sulfur as substantially exists in the established bath just prior to quenching. The activated nickel metal product was then treated with carbon monoxide at about 54 atmospheres gauge and at 275° F. for 16 hours. The carbonyl volatilizer residues were analyzed to determine percent nickel extraction. Table A following outlines the results of these tests:

TABLE A

| | Analysis of Oxygen Top-Blown Metal [1] | | | | Percent nickel extraction |
|---|---|---|---|---|---|
| Test No.: | Percent Ni | Percent Cu | Percent Co | Percent S | |
| 1 | 97.2 | 1.56 | 0.77 | 0.04 | 44 |
| 2 | 97.0 | 0.9 | 0.86 | 0.12 | 59 |
| 3 | 96.7 | 1.57 | 0.77 | 0.56 | 96 |
| 4 | 96.3 | 0.88 | 0.83 | 0.90 | 99 |
| 5 | 96.0 | 0.88 | 0.76 | 1.16 | 99 |

[1] The balance less than 0.2% Fe, minor amounts of precious metals and refractory oxides, etc.

As can be seen by these test results, at a sulfur content in the end product of substantially less than about 0.56%, for example, less than 0.2% sulfur, the metal is quite inactive and extraction of nickel by carbonyl procedures at reasonable elevated pressures and carbonylation times is unsatisfactory. The results also confirm that the drastically quenched metal containing sulfur within the desired range as contemplated by the invention is very active in the carbonylation reaction. It is noted that the nickel carbonylating process is very efficient, particularly at sulfur contents of at least about 0.5%, for example, in the neighborhood of about 1%, at which sulfur level optimum yields are indicated.

Example II

Additional tests were conducted upon metal produced from copper-nickel matte blown with oxygen to lower the iron to less than about 0.3% by weight and remove substantially all of the sulfur except for the amounts set forth in Table B hereinafter. The same method of treatment was employed as described in Example I. In addition to nickel, the end product also contained about 5% copper. In each instance, the established molten metal was drastically quenched in water to provide a particulate metal product in a virtually instantaneously solidified condition. Each of the end products was reacted with carbon monoxide at a temperature of 275° F. and at a relatively low superatmospheric pressure of about 20 atmospheres gauge for 16 hours with the following results set forth in Table B:

TABLE B

| Original metal [1] assay, percent | | | Volatilizer residue | | Ni extraction 20 atmospheres gauge percent |
|---|---|---|---|---|---|
| Cu | Ni | S | Weight percent | assay, percent Nickel | |
| 4.98 | 92.6 | 0.16 | 78.7 | 90.2 | 23 |
| 4.90 | 91.0 | 1.15 | 22.6 | 65.3 | 84 |
| 4.85 | 92.4 | 1.97 | 16.6 | 52.0 | 91 |

[1] The balance less than 0.2% Fe, about 0.7% to 0.9% Co, minor amounts of precious metals, refractory oxides, etc.

The foregoing data confirm that improved extraction efficiency is obtained at a sulfur content in the active metal over 0.2%, such as from about 1% to less than 2% along with a controlled low iron content without resorting to high carbonylation pressure as would normally have been required for non-activated metal.

For the purpose of giving those skilled in the art a better understanding of the invention, the following additional examples are given showing the particular utility of the invention as applied to activated nickel compositions containing copper in amounts up to about 38%:

Example III

Molten nickel mattes with varying copper contents ranging from approximately 0.9% to approximately 38% were blown with oxygen to produce metal products having varying sulfur contents. Each of the established baths was drastically quenched in water and the resulting particulate product in a virtually instantaneously solidified condition then reacted with carbon monoxide at a temperature of 275° F. and a pressure of 54 atmospheres gauge for 16 hours. In each case, the metals and the volatilizer residues were analyzed and the nickel extractions resulting from carbonylation were calculated. The results are given in the following Table C:

TABLE C

| Test No.: | Original metal [1] assay, percent | | | Volatilizer residue | | Nickel extraction percent |
|---|---|---|---|---|---|---|
| | Cu | Ni | S | Weight, percent | Assay, percent Ni | |
| 1 | 0.9 | 97.0 | 0.12 | | | 59 |
| | 0.88 | 96.3 | 0.90 | 5.5 | 16.8 | 99 |
| | 0.88 | 96.0 | 1.16 | 5.6 | 16.2 | 99 |
| 2 | 4.98 | 92.6 | 0.17 | 74.8 | 88.1 | 29 |
| | 4.90 | 91.0 | 1.15 | 22.6 | 65.3 | 84 |
| | 4.88 | 91.2 | 2.10 | 21.0 | 56.7 | 87 |
| 3 | 38.0 | 60.5 | 0.09 | 93.8 | 59.5 | 8 |
| | 37.0 | 59.2 | 1.4 | 47.2 | 14.4 | 89 |

[1] The balance less than 0.2% Fe, about 0.7% to 0.9% Co, minor amounts of precious metals, refractory oxides, etc.

The data in the foregoing table confirm that even when the copper content is as high as 37%, good extractions are obtained at sulfur contents ranging from about 0.9% to 2%. This example illustrates the surprising activity during carbonylation of nickel-containing materials produced in accordance with the present invention, even in the presece of high amounts of copper and with sulfur contents insufficient to chemically combine with all of the copper.

It is advantageous to maintain the sulfur content in the drastically quenched active nickel metal product within the special ranges set forth hereinbefore because, when sulfur contents greater than these amounts are present, not only is the nickel recovery upon carbonylation reduced, but also a greater proportion of carbonylation residue is produced and the difficulties in treating the residue to recover metal values contained therein are increased. This latter factor is important in regard to the commercial acceptability of the overall process since valuable metals such as copper, cobalt, platinum-group metals, etc., present in the active nickel metal are highly concentrated in the residue and advantageously are recovered therefrom. It is found that the less bulky residues remaining after treatment of the active metal product containing the specially controlled amounts of sulfur contemplated in accordance with the invention are high in metal content making them readily amenable to leaching processes at atmospheric pressures for the purpose of recovering metal values therefrom.

Example IV

An agitated bath of molten pentlandite concentrate containing about 25% nickel, 34% iron, 0.85% cobalt, 33% sulfur and a small amount of copper and other impurities making up the balance was smelted autogenously with silica flux in a converter with oxygen-enriched air at a temperature of about 2250° F. A cold mixture of sulfide concentrate and flux was added semi-continuously and iron silicate slag was withdrawn intermittently. Oxidation and slagging of the iron was continuous until the matte contained 1.09% iron and 23.5% sulfur (Bessemer matte). This Bessemer matte was then blown with an oxygen lance to remove substantially all of the iron, almost all of the sulfur and to provide molten nickel metal having a final sulfur content of 0.57%, at which sulfur level the melt temperature was about 3000° F. The molten nickel metal which was drastically quenched to form a particulate nickel metal product containing 0.57% sulfur was found to be highly reactive for the formation of nickel metal by carbonyl techniques. Reaction of the thus produced active metal with carbon monoxide at 275° F. and 54 atmospheres gauge for 16 hours resulted in a high extraction yield of 97.7% of the nickel as nickel carbonyl.

Example V

An agitated bath of molten nickel sulfide containing 70.8% nickel, 0.09% iron, 0.67% cobalt, 0.65% copper, and the balance sulfur and other impurities was surface blown with an oxygen lance to remove sulfur. The final temperature of the melt was again about 3000° F. The molten material was blown to remove almost all of the sulfur and produce metal analyzing 96.2% nickel, 0.12% iron, 0.8% cobalt, 0.9% copper, 0.9% sulfur and the balance precious metals, refractory oxides, etc. The molten metal was drastically quenched to form a particulate product which was reacted with carbon monoxide at 300° F. and 54 atmospheres gauge for 16 hours. Nickel extraction as nickel carbonyl was 99%. All the iron, cobalt and copper remained in the solid residue and substantially complete separation of nickel from iron, cobalt and copper was obtained.

As an additional illustration of the importance of controlling the sulfur content, the same nickel sulfide was surface blown directly to metal in the same manner except that the sulfur was removed to a level of 0.095%. The molten metal obtained was drastically quenched to form a particulate product as aforesaid, which was then reacted with carbon monoxide under the same conditions as the metal blown to 0.9% sulfur. After 16 hours only 42% of the nickel had been extracted as carbonyl.

Example VI

Additional confirmation of the activity of a virtually instantaneously solidified nickel metal product at relatively low superatmospheric carbonylation pressures is shown by this example. A 3000 pound agitated molten metal bath containing, by weight, 20.5% copper, 72.8% nickel, 2.32% iron, 0.95% cobalt and 2.93% sulfur was established. The molten metal bath was drastically quenched by granulating in water and the particulate virtually instantaneously solidified product without subsequent treatment was then carbonylated. The conditions of carbonylation were 68 atmospheres gauge and 330° F. for 21 hours. The nickel extraction was 95%.

It is apparent from the foregoing description that a simple, direct and unique method is provided for producing as an article of manufacture an active cast nickel metal product having particular commercial utility. The term "nickel metal product" as employed herein is meant to cover a specially prepared alloy composition containing up to about 45% copper, up to about 3% iron, usually below about 0.5%, e.g., about 0.2% iron, from about 0.2% to 2% sulfur and the balance essentially nickel. We find it particularly advantageous for our purposes to control both the iron and the sulfur content in the final nickel metal product to not more than about 2% each in order to provide a virtually instantaneously solidified nickel metal product of desired activity for subsequent carbonylation at low pressure in the production of pure nickel carbonyl.

We find it particularly desirable for our purposes to keep the initial iron content low in order to insure consistently high recoveries of nickel as pure nickel carbonyl during low pressure carbonylation. For example, a molten bath containing 29.9% nickel, 64.7% iron and 1.2% sulfur was granulated in accordance with the present invention and after 16 hours of carbonylation at 275° F. and 54.5 atmospheres gauge only 7% of the nickel was extracted as nickel carbonyl.

As noted hereinabove, nickel extraction by carbonylation at low pressures can be materially increased by controlling the iron content. Sulfur is present in amounts and in such a state of distribution as to activate the nickel present for low pressure carbonylation. The maximum sulfur content is generally limited to about 2% because during carbonylation the available sulfur reacts with the nickel to form nickel sulfide in which form nickel cannot react with carbon monoxide at moderate pressures to form nickel carbonyl and consequently nickel extraction is materially lowered. However, when the iron content is controlled within the limits stated hereinbefore and the copper content exceeds about 15%, the sulfur content can be as high as about 4%.

As stated hereinbefore, we find that the desired objectives can be achieved by drastically quenching the aforementioned nickel metal product from the molten state in order to preserve in the virtually instantaneously solidified condition, as closely as possible the uniform distribution of sulfur as it exists in the molten bath just prior to quenching so as to assure the desired level of activity in the final nickel metal product. While it is not certain what is the particular state of the sulfur in the quenched product, it is believed that the alloy composition in the virtually instantaneously solidified condition has the attributes of a metastable solid solution.

As illustrative of the foregoing, a nickel metal product comprising a nickel-copper alloy having a nickel to copper ratio of about 3:1 and sulfur in the neighborhood of about 2% was slowly cooled from the molten state to produce segregated sulfur. Upon carbonylation of this material at 54 atmospheres gauge and at about 300° F., only about 17% of the nickel was extracted after 16 hours. Another portion of the same material which was melted and drastically quenched according to the invention provided a nickel extraction of about 94% as nickel carbonyl under the same carbonylation conditions.

Whatever the explanation, we find drastic quenching to be particularly advantageous for our purposes in that it enables the production of highly active nickel metal characterized by a fine grained structure having sulfur within the range of amounts stated hereinbefore, intimately and uniformly distributed throughout the matrix of the product in the virtually instantaneously solidified condition.

The present invention has been illustrated by showing the processing of naturally occurring and synthetic sulfidic materials, but as has been stated hereinbefore, it is to be understood that other synthetically prepared sulfidic materials can likewise be treated in accordance with the teachings of the present invention. Thus, nickel matte produced in accordance with the procsss of U.S. Patent No. 3,004,846 can also be treated by employing only a few simple operations to produce an active nickel metal product from which pure nickel carbonyl product may then be obtained.

With regard to the nickel carbonyl produced in accordance with this invention, it will be appreciated that it may have a wide range of utility. The most obvious use is the decomposition of the nickel carbonyl to form metallic nickel. Because of the purified nature of the nickel carbonyl produced as an adjunct of the teachings of the present invention, it can find use in such diverse fields as in chemical processing operations as a catalyst or in the electronic field in the deposition of ohmic contacts, etc.

The present invention is not to be confused with prior art processes in which the presence of sulfur is required to chemically bind co-present metals such as copper and iron or prior art processes in which substantial quantities of sulfur are present to facilitate carbonylation of iron and nickel. Thus, the process of U.S. Patent No. 2,086,881 requires the addition of sulfur during smelting, and not the removal of it, to obtain a "matte." This process evidently strives to provide sufficient sulfur to assure that all of the copper present exists as cuprous sulfide and to provide sulfur sufficient to be up to 40% by weight of the iron present. The presence of such quantities of sulfur has the disadvantage that a substantial portion of the sulfur can combine with nickel to form nickel sulfide which must be further treated or the carbonylation pressures must be increased to a point where it becomes uneconomical. However, even if sulfur is present in the amounts specified by the process of said patent to chemically bind the iron, nickel recoveries at low carbonylating pressures are still undesirably low. For example, molten baths containing 30% nickel, 57.6% iron and 10.1% sulfur and 31.7% nickel, 44.1% iron and 20.4% sulfur, respectively, were granulated in water in accordance with the present invention and the resulting particulate products were carbonylated at 275° F. and 54.5 atmospheres gauge. The nickel recoveries were 35% and 53%, respectively. It should be further noted that substantial quantities of iron carbonyl are recovered in admixture with nickel carbonyl as a result of carbonylation at high pressures, e.g., 200 atmospheres, as taught in the said patent and the admixture must be distilled at least once, e.g., two or three times, to obtain nickel carbonyl free of iron.

Our invention, however, enables us to establish a molten bath of low iron content, and, therefore, eliminates the need of using excessive amounts of sulfur (as practiced in U.S. Patent No. 2,086,881) and the problems associated therewith by providing low concentrations of sulfur in a highly active form, particularly when we start with the oxygen converting step.

Another prior art process with which the present invention should not be confused is the process described in U.S. Patent No. 2,944,883. The process of the latter patent is directed to a solid state process comprising roasting sulfidic materials to their respective oxides, selectively reducing the oxides to correlate the reduced iron and nickel contents and carbonylating the reduced metals after sulfur in amounts not exceeding 2% has been added to the solid material in order to recover a mixture of nickel, cobalt and iron carbonyls. Although the process of the latter patent has great utility, it is to be noted that a number of closely controlled operations are necessary and the skilled artisan is cautioned on the use of temperatures exceeding about 1600° F. In this connection, our invention differs in that we can advantageously establish our bath in a furnace from a high sulfur melt and then surface blow with oxygen or oxygen plus air and directly form our active nickel metal product by simply removing substantially all of the iron and substantially all of the sulfur to the required level followed by drastic quenching. Thus, provisions for a number of closely controlled steps with the attendant precautions against exceeding certain temperatures and for the subsequent addition of sulfur are eliminated. The foregoing difficulties and disadvantages of prior art techniques are overcome by the practice of our invention in that we go directly to a highly active nickel metal product with only a few operational steps, which product can then be carbonylated at surprisingly low pressures to yield substantially pure nickel carbonyl. It will be appreciated that while our novel product is exceptionally active at low carbonylating pressure, it will follow that it will be even more so at elevated superatmospheric pressures ranging to above 100 atmospheres.

Although the present invention has been described in conjunction with preferred embodiments, it is to be understood that modifications and variations may be resorted to without departing from the spirit and scope of the invention, as those skilled in the art wil readily understand. Such modifications and variations are considered to be within the purview and scope of the invention and appended claims.

We claim:

1. A process for producing substantially pure nickel carbonyl from a nickel-containing material which comprises establishing a molten metal bath containing by weight up to about 45% copper, less than about 3% iron, less than about 4% sulfur, and the balance essentially nickel, subjecting material from said molten metal bath to drastic quenching, whereby to form fine grained solid active nickel metal particles in the virtually instantaneously solidified condition having said sulfur intimately and uniformly distributed through substantially each of said particles, and then carbonylating said drastically quenched particles at superatmospheric pressures to form substantially pure nickel carbonyl.

2. A process for producing substantially pure nickel carbonyl from a sulphidic material containing nickel and iron which comprises forming a molten bath of a nickel-containing and iron-containing sulphidic material, treating said bath with oxygen while maintaining said bath in a state of agitation to effect oxidation of oxidizable materials in said bath and substantially reduce the sulfur content whereby to establish a molten nickel metal bath containing by weight about 0.2% to 2% sulfur and less than 3% iron, subjecting a stream of said molten nickel metal bath to drastic quenching to form fine grained solid active nickel metal particles in a drastically solidified condition having said sulfur intimately and uniformly distributed throughout substantially each of said particles, and then carbonylating the drastically quenched active nickel metal product at a superatmospheric pressure to form substantially pure nickel carbonyl.

3. A process for producing substantially pure nickel carbonyl from sulphidic materials containing nickel comprising an agitated molten bath of sulphidic material containing by weight up to about two-thirds of the bath as iron and up to about one-third as copper, up to about 5% cobalt, at least about 5% and up to about 35% sulfur, and substantially the balance at least about 15% and up to about 75% nickel, treating said molten bath with gaseous oxygen while maintaining said bath in a state of agitation to oxidize the sulfur and other oxidizable impurities and to establish a molten metal bath containing up to about 40% copper, less than about 0.5% iron and from about 0.2% to 2% sulfur and the balance essentially nickel, subjecting a stream of said molten metal bath to drastic quenching whereby to form fine grained solid active nickel metal particles in the drastically solidified condition having said sulfur intimately and uniformly distributed throughout substantially each of said particles, and then carbonylating said drastically quenched active nickel metal particles at a superatmospheric pressure to form substantially pure nickel carbonyl.

4. A process for producing substantially pure nickel carbonyl from a sulphidic material containing nickel and iron which comprises forming a bath of a sulphidic material containing by weight up to about two-thirds of the bath as iron and up to about one-third as copper, up to about 5% cobalt, at least about 5% and up to about 35% sulfur, and substantially the balance at least about 15% and up to about 75% nickel, treating the surface of said bath with a gas stream of oxygen to effect oxidation of sulfur and other oxidizable impurities while maintaining said bath in a state of agitation by means independent of the gas stream and maintaining the temperature of said bath between the melting point and about 3300° F. to oxidize the sulfur from said bath down to about 2% to about 5% by weight while substantially eliminating iron, thereafter regulating the ambient atmosphere to eliminate substantially the oxygen in the metal and to lower the sulfur content by removing said sulfur down to a value of about 0.2% to 2%, and establish a molten metal bath with less than about 0.5% iron and up to 40% copper, subjecting a stream of said molten metal bath to drastic quenching whereby to form fine grained solid active nickel metal particles in a drastic solidified condition having said sulfur intimately and uniformly distributed throughout substantially each of said particles, and then carbonylating the active nickel metal particles at a superatmospheric pressure less than 100 atmospheres gauge to form substantially pure nickel carbonyl.

5. A process for producing substantially pure nickel carbonyl from sulfidic material which comprises establishing a molten bath containing by weight at least about 15% and up to about 45% copper, up to about 3% iron, from about 0.2% to about 4% sulfur, and the balance essentially nickel, subjecting a stream of said molten metal bath to drastic quenching, whereby to form fine grained solid active nickel metal particles in a virtually instantaneously solidified condition having said sulfur intimately and uniformly distributed through substantially each of said particles, and then carbonylating said drastically quenched particles at low superatmospheric pressure to form substantially pure nickel carbonyl.

6. A process for producing substantially pure nickel carbonyl from a sulfidic material containing nickel and iron which comprises forming a bath of a sulfur material containing by weight up to about two-thirds the bath as iron and up to about one-third as copper, up to about 5% cobalt, at least about 5% and up to about 35% sulfur, and substantially the balance at least about 15% and up to about 75% nickel, treating the surface of said bath with a gas stream of oxygen to effect oxidation of sulfur and other oxidizable impurities while maintaining said bath in a state of agitation by means independent of the gas stream and maintaining the temperature of said bath between the melting point and about 3300° F. to oxidize the sulfur from said bath down to about 2% to about 5% by weight while substantially eliminating iron, and after regulating the ambient atmosphere to eliminate substantially all of the oxygen from the material and to lower the sulfur content to a value of about 0.2% to about 4%, and to establish a molten bath containing up to about 2% iron and at least about 15% and up to about 45% copper, subjecting a stream of said molten metal bath to drastic quenching whereby to form fine grained solid active nickel metal particles in a virtually instantaneously solidified condition having said sulfur intimately and uniformly distributed throughout substantially each of said particles, and then carbonylating the active nickel metal particles at superatmospheric pressures less than about 100 atmospheres gauge to form substantially pure nickel carbonyl.

7. A process for producing an article of manufacture of active nickel metal product from sulfidic materials containing nickel which comprises forming an agitated molten bath of sulfidic material containing by weight up to about two-thirds of the bath as iron and up to about one-third copper, up to about 5% cobalt, at least about 5% and up to about 35% sulfur, and substantially the balance at least about 15% and up to about 75% nickel, treating said molten bath with gaseous oxygen while maintaining said bath in a state of agitation to oxidize the sulfur and other oxidizable impurities and establishing a molten metal bath containing at least about 15% and up to about 45% copper, up to about 3% iron and from about 0.2% to about 4% sulfur, and the balance essentially nickel, and subjecting metal from said molten bath to drastic quenching to form a solid active nickel metal product in a virtually instantaneously solidified condition having said sulfur intimately and uniformly distributed throughout said product and characterized by high nickel extraction during low superatmospheric pressure carbonylation.

8. A process for producing as an article of manufacture an active nickel metal product from sulphidic materials containing nickel which comprises forming an agitated molten bath of sulphidic material containing by weight up to about two-thirds of the bath as iron and up to about one-third copper, up to about 5% cobalt, at least about 5% and up to about 35% sulfur, and substantially the balance at least about 15% and up to about 75% nickel, treating said molten bath with gaseous oxygen while maintaining said bath in a state of agitation to oxidize the sulfur and other oxidizable impurities and establish a molten metal bath containing up to about 40% copper, less than about 2% iron and from about 0.2% to 2% sulfur, and the balance essentially nickel and subjecting metal from said molten metal bath to drastic quenching to form a solid active nickel metal product in a vertually instantaneously solidified condition characterized by high nickel extraction during low superatmospheric pressure carbonylation.

References Cited
UNITED STATES PATENTS

| | | | |
|---|---|---|---|
| 2,245,503 | 6/1941 | Schlecht | 75—82 |
| 3,069,254 | 12/1962 | Queneau et al. | 75—82 |
| 2,086,881 | 7/1937 | Schlecht. | |

OSCAR R. VERTIZ, Primary Examiner

HOKE S. MILLER, Assistant Examiner

U.S. Cl. X.R.

75—0.5, 21, 82